United States Patent
Kim

(10) Patent No.: US 7,652,722 B2
(45) Date of Patent: Jan. 26, 2010

(54) APPARATUS AND METHOD FOR DISPLAYING MULTIPLE CHANNELS AND CHANGING CHANNELS IN A PORTABLE TERMINAL HAVING A TELEVISION VIDEO SIGNAL RECEIVING FUNCTION

(75) Inventor: Bo-Yeon Kim, Gumi-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 532 days.

(21) Appl. No.: 11/103,607

(22) Filed: Apr. 12, 2005

(65) Prior Publication Data
US 2005/0225685 A1    Oct. 13, 2005

(30) Foreign Application Priority Data
Apr. 13, 2004    (KR) ............... 10-2004-0025393

(51) Int. Cl.
*H04N 5/45* (2006.01)
(52) U.S. Cl. .............. 348/565; 348/563; 348/564; 348/569; 348/734
(58) Field of Classification Search ......... 348/563–565, 348/569, 734, 7, 906, 12–13, 731, 584, 588, 348/686, 589, 598, 600, 567; 725/37, 39, 725/40–43; *H04N 5/45*
See application file for complete search history.

(56) References Cited

U.S. PATENT DOCUMENTS

| | | | |
|---|---|---|---|
| 5,900,868 A * | 5/1999 | Duhault et al. ............... 725/42 |
| 6,323,911 B1 * | 11/2001 | Schein et al. ............... 348/552 |
| 6,532,590 B1 * | 3/2003 | Chimoto ...................... 725/43 |
| 6,564,378 B1 * | 5/2003 | Satterfield et al. ............ 725/40 |
| 7,030,933 B2 * | 4/2006 | Takagi et al. ................ 348/569 |
| 7,230,655 B2 * | 6/2007 | Nonomura .................. 348/734 |
| 2004/0055011 A1 | 3/2004 | Bae et al. |

FOREIGN PATENT DOCUMENTS

| | | |
|---|---|---|
| CN | 1218598 | 6/1999 |
| CN | 1261241 | 7/2000 |

* cited by examiner

*Primary Examiner*—Trang U Tran
(74) *Attorney, Agent, or Firm*—Roylance, Abrams, Berdo & Goodman, LLP

(57) ABSTRACT

An apparatus and method for displaying television (TV) video data in a portable terminal having a TV video signal receiving function. The apparatus and method include displaying first video data on a first display unit in a TV mode, displaying a channel list during a channel change, displaying video data for a channel selected from the channel list on a second display unit, and displaying the video data displayed on the second display unit on the first display unit when the video data displayed on the second display unit is selected.

18 Claims, 13 Drawing Sheets

APPARATUS AND METHOD FOR DISPLAYING MULTIPLE CHANNELS AND CHANGING CHANNELS IN A PORTABLE TERMINAL HAVING A TELEVISION VIDEO SIGNAL RECEIVING FUNCTION

PRIORITY

This application claims the benefit under 35 U.S.C. § 119(a) to an application entitled "Method for Displaying Multiple Channels and Changing Channels in Portable Terminal Having Television Video Signal Receiving Function" filed in the Korean Intellectual Property Office on Apr. 13, 2004 and assigned Serial No. 2004-25393, the entire contents of which are incorporated herein by reference.

BACKGROUND OF THE INVENTION

1. Field of the Invention

The present invention relates generally to a portable terminal having a television (TV) video signal receiving function. In particular, the present invention relates to an apparatus and method for displaying multiple channels in a portable terminal having a tuner, and an apparatus and method for changing a channel based on a user's preference.

2. Description of the Related Art

Portable terminals are evolving into advanced portable terminals capable of offering not only voice communication but also high-speed data transmission. If International Mobile Telecommunications for the year 2000 (IMT-2000) mobile communication networks are commercially deployed in the near future, people can enjoy high-speed data communication as well as voice communication using the portable terminals. Data processed by the portable terminals for data communication may include packet data and video data.

The portable terminals include display units, whose sizes have become larger. In recent years, consumers have also witnessed the emergence of portable terminals that can display picture data (or pixel data) received from a base station and process picture data photographed by built-in cameras. TV video signals can be received and displayed using such portable terminals. In this case, a TV video signal receiving function should be added to the portable terminals, and the portable terminals should be able to process the TV video signals simultaneously with or independently from radio communication.

SUMMARY OF THE INVENTION

It is, therefore, an object of the present invention to provide an apparatus and method for displaying multiple channels in a portable terminal having a tuner, and an apparatus and method for changing a channel in response to a user's selection.

To achieve the above and other objects, there is provided an apparatus and method for displaying television (TV) video data in a portable terminal having a TV video signal receiving function. The apparatus and method comprise displaying first video data on a first display unit in a TV mode, displaying a channel list during a channel change mode, displaying video data for a channel selected from the channel list on a second display unit, and displaying the video data displayed on the second display unit on the first display unit when the video data displayed on the second display unit is selected.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
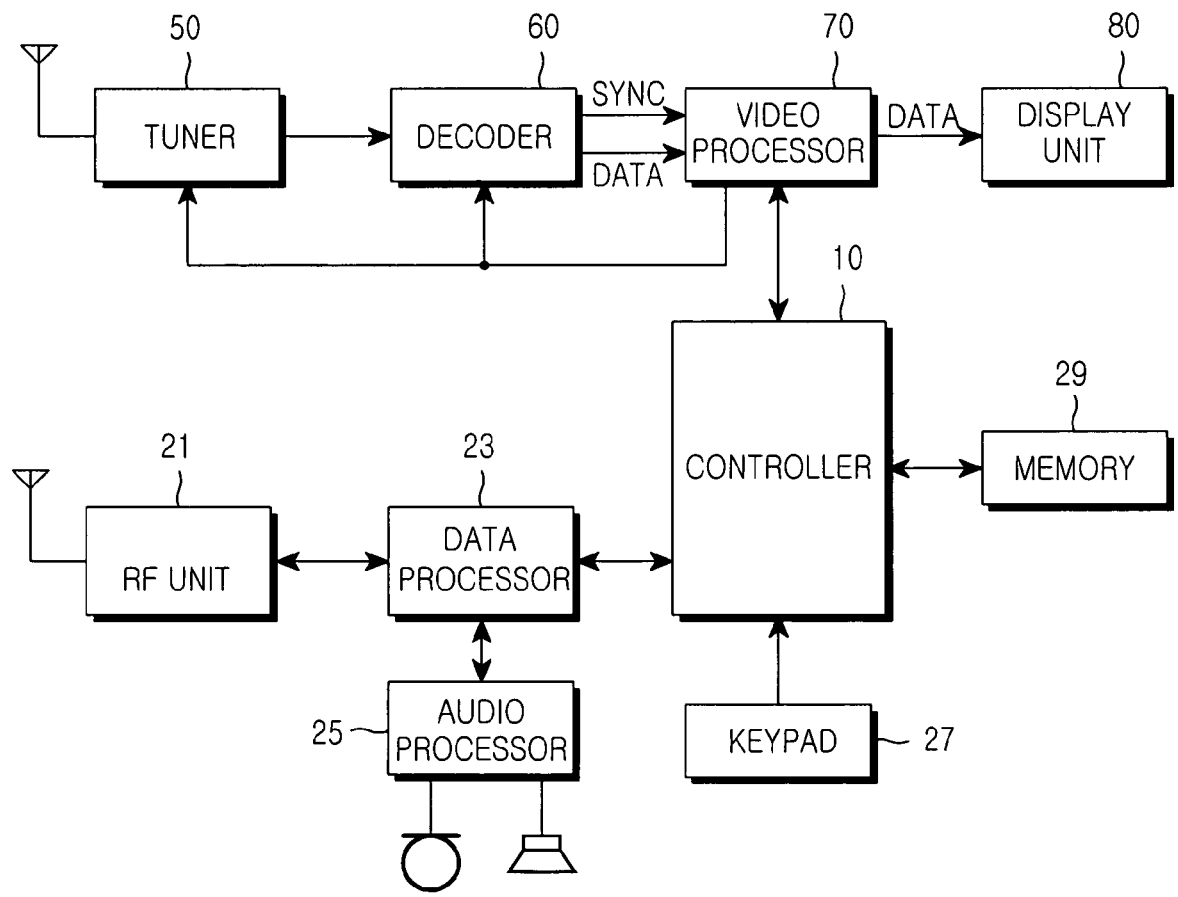
FIG. 1 is a block diagram illustrating the structure of a portable terminal that displays a TV video signal according to an embodiment of the present invention.

Embodiments of the present invention will now be described in detail with reference to the accompanying drawings. In the drawings, the same or similar elements are denoted by the same reference numerals throughout the drawings. In the following description, a detailed description of known functions and configurations incorporated herein has been omitted for conciseness.

In the following description, specific details such as the number of pixels per frame and the number of image pixels in scaled maximum and minimum frames are exemplary. However, it should be understood by those skilled in the art that the present invention may be implemented without those examples.

FIG. 1 is a block diagram illustrating the structure of a portable terminal that displays a TV video signal according to an embodiment of the present invention. Here, the portable terminal may be a mobile telephone.

Referring to FIG. 1, a radio frequency (RF) unit 21 performs a radio communication function for the portable terminal. The RF unit 21 includes an RF transmitter (not shown) for up-converting a frequency of a transmission signal and amplifying the up-converted transmission signal and an RF receiver (not shown) for low-noise-amplifying a received signal and down-converting a frequency of the low-noise-amplified signal.

A data processor 23 includes a transmitter (not shown) for encoding and modulating the transmission signal and a receiver (not shown) for decoding and demodulating the received signal. Thus, the data processor 23 can comprise a modem and a codec.

An audio processor 25 reproduces a received audio signal output from the data processor 23 on a speaker "SPK", and/or transmits a transmission audio signal generated by a microphone "MIC" to the data processor 23.

A keypad 27 includes alphanumeric keys for inputting number and character information and function keys for setting various functions. Also, the key pad 27 may include mode setting keys for processing at least two TV video signals according to an embodiment of the present invention.

A memory 29 can comprise program memory and data memory. The program memory can store programs for controlling general operations of the portable terminal and programs for processing at least two TV video signals according to an embodiment of the present invention. The data memory temporarily stores data generated during execution of the programs.

A controller 10 controls the overall operation of the portable terminal. The controller 10 may include the data processor 23. According to an embodiment of the present invention, the controller 10 sets a video processor 70 to a TV mode when a mode change key is input from the keypad 27, and displays one or two screens on a display unit 80 according to the set TV mode. After a lapse of a predetermined time, the controller 10 replaces video data presently displayed on a second display unit 82 with another selected video data according to an embodiment of the present invention. Upon receiving a channel change request, the controller 10 displays a channel list and video data for the requested new channel on the display unit 80 according to an embodiment of the present invention.

A tuner 50, under the control of the controller 10, receives a TV video signal for a selected channel, and performs frequency conversion on the received TV video signal. The tuner 50 receives at least one video signal in an embodiment of the present invention.

A decoder 60 demodulates and decodes the TV video signal output from the tuner 50, and outputs color signals (such as Red (R), Green (G), and Blue (B)) and synchronization signals (such as horizontal synchronization and vertical synchronization signals).

The video processor 70 performs data communication with the controller 10 and performs signal processing for displaying the TV video signal output from the decoder 60 under the control of the controller 10. The video processor 70 processes the TV video signal output from the decoder 60 and user data output from the controller 10, and outputs the processed data to their corresponding regions on the display unit 80. Here, the user data includes channel indication data, present-time data, residual battery indication data, and reception sensitivity indication data, and further includes status indication data for indicating a new state determined due to a change in state of the TV mode. The video processor 70 processes the TV video signal in a frame size and separately outputs the TV video data and the user data. In the TV mode, the video processor 70 processes the TV video signal in a maximum frame size and a minimum frame size according to an embodiment of the present invention.

The display unit 80 displays data output from the controller 10 in a communication mode, and displays the TV video data and the user data output from the video processor 70 in their corresponding regions in the TV mode. Here, the display unit 80 may be a liquid crystal display (LCD), and if so, the display unit 80 may include a LCD controller, a memory for storing video data, and a LCD display device. Here, when the LCD is implemented with a touch screen, the display unit 80 may also serve as an input unit.

Also, the display unit 80 comprises a first display unit (specifically, a first display region) 81 and a second display unit (specifically, a second display region) 82 (see FIG. 2) according to an embodiment of the present invention. The display unit 80 displays maximum frame-sized video data output from the video processor 70 on the first display unit 81, and minimum frame-sized video data output from the video processor 70 on the second display unit 82. Video data can be optionally displayed on the second display unit 82 according to the presently set mode, and the second display unit 82 can be disposed in a position selected by the user.

With reference to FIG. 1, a description will now be made of an operation of the portable terminal having the TV video signal receiving function in the communication mode. When a user presses a Send key after dialing via the keypad 27 in the communication mode, the controller 10 processes the input dial information via the data processor 23, and converts the processed dial information into an RF signal and transmits the RF signal via the RF unit 21. Thereafter, when a called subscriber sends an acknowledgement (ACK) signal in response to the RF signal, the controller 10 detects the ACK signal through the RF unit 21 and the data processor 23. The user then communicates with the called subscriber using a speech path formed through the audio processor 25. In a call receiving mode, the controller 10 detects the setting of the call receiving mode through the data processor 23, and generates a ring signal through the audio processor 25. Upon receiving a response to the ring signal from the user, the controller 10 allows the user to communicate with the called party using the speech path established through the audio processor 25. Although the call receiving mode will be restricted herein to voice communication for convenience of explanation, it is also open to data communication for packet data and video data. In an idle mode or a character communication mode, the controller 10 displays character data processed by the data processor 23 on the display unit 80.

Figure 2:
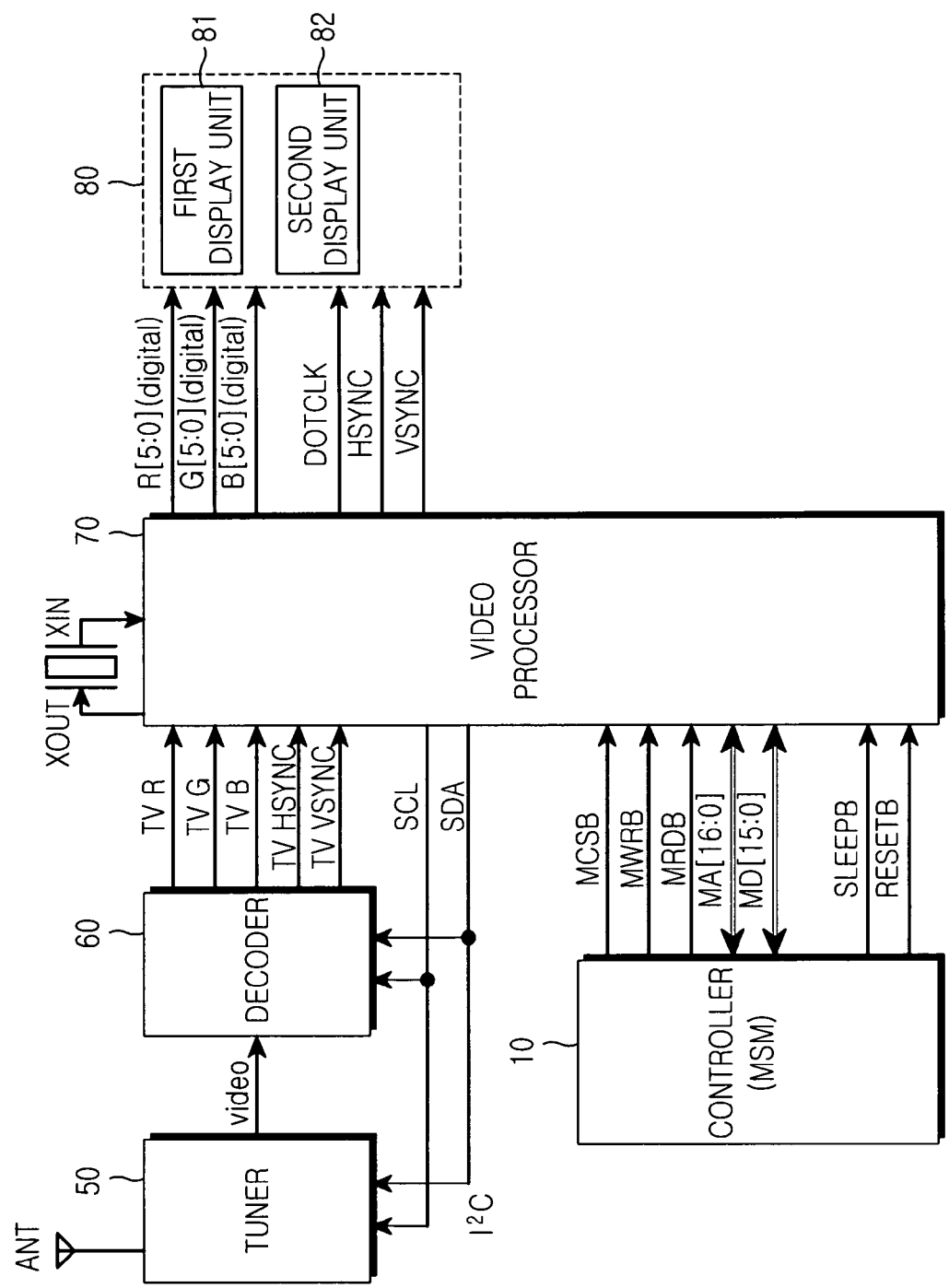
FIG. 2 is a detailed block diagram illustrating a connection between the controller and the components for receiving a TV video signal, illustrated in FIG. 1.

FIG. 2 is a detailed block diagram illustrating a connection between the controller 10 and components for receiving a TV video signal, illustrated in FIG. 1, according to an embodiment of the present invention.

With reference to FIGS. 1 and 2, an example will now be provided as to how the portable terminal having the TV video signal receiving function operates in the TV mode.

When the user selects the TV mode, the controller 10 notifies the video processor 70 that the user selected the TV mode. The video processor 70 then outputs channel control data for channel selection to the tuner 50 and drives the decoder 60. The tuner 50 is then tuned to a channel corresponding to the channel control data output from the video processor 70, performs frequency conversion on a TV video signal received over the tuned channel, and outputs the frequency-converted TV video signal to the decoder 60. The decoder 60 decodes the received TV video signal, and outputs analog RGB video signals and synchronization signals (such as horizontal synchronization signals and vertical synchronization signals). The decoder 60 separates color signals from a received composite video signal and outputs the color signals. Here, the decoder 60 may be a National Television System Committee (NTSC) decoder. The video processor 70, receiving the RGB video signals and the synchronization signals from the decoder 60, adds the user data to the TV video signal and outputs resulting data to the display unit 80. Here, the user data may be channel number data output from the controller 10. Alternatively, the user data may be created by the video processor 70 under the control of the controller 10. The user data can be displayed on the display unit 80 using an on-screen display (OSD) technique supporting a function of capturing a displayed TV screen and a function of block-copying an OSD screen. The video processor 70 receives analog RGB TV video signals, converts the received analog RGB TV video signals into digital data through its embedded analog-to-digital (A/D) converter, scales the digital data to a corresponding frame size through its embedded format scaler, and outputs the scaled digital data to the display unit 80.

Figure 3:
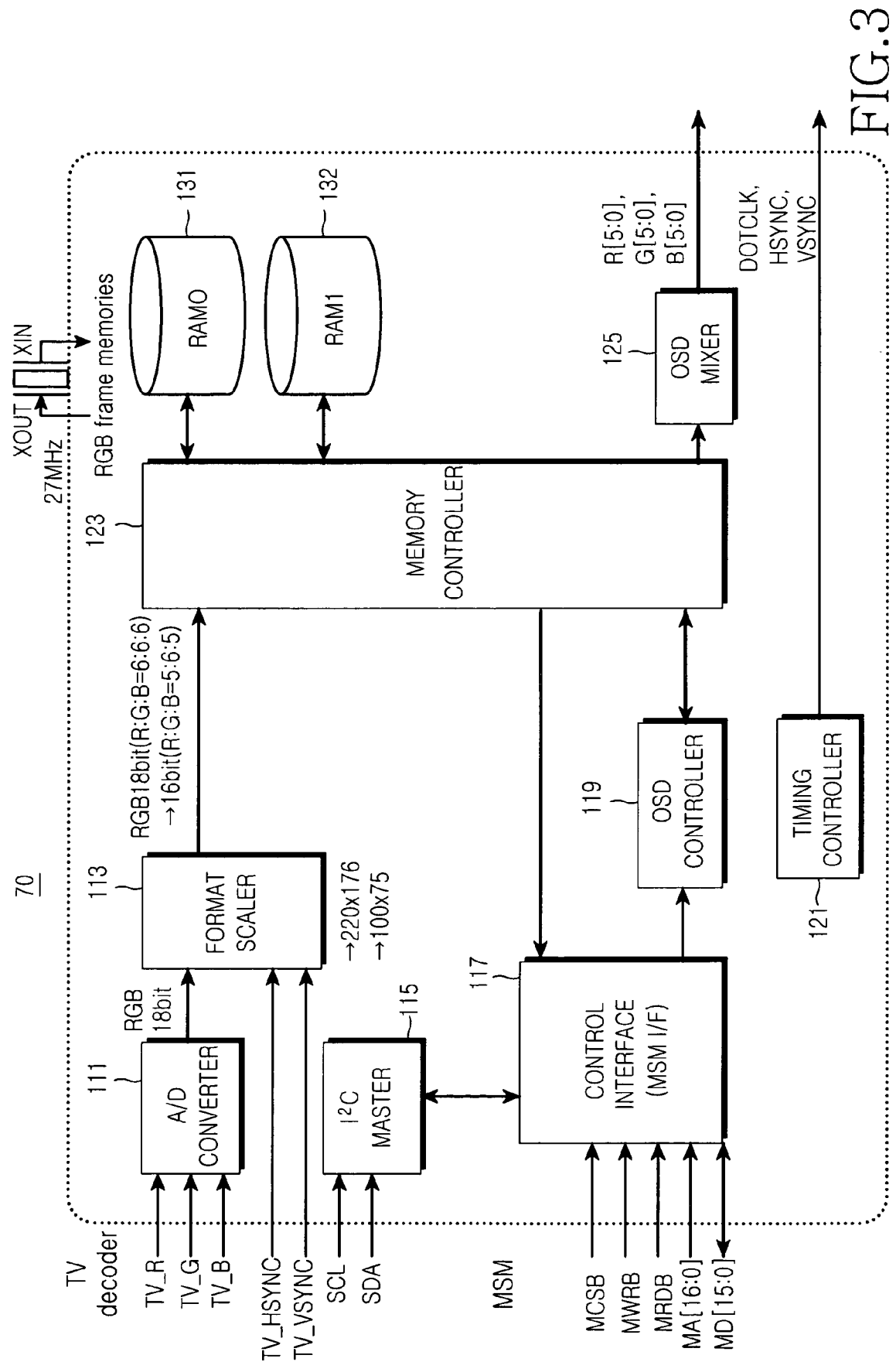
FIG. 3 is a detailed block diagram illustrating the structure of the video processor shown in FIGS. 1 and 2.

FIG. 3 is a detailed block diagram illustrating the structure of the video processor 70 shown in FIGS. 1 and 2.

An operation of the video processor 70 will be described with reference to FIG. 3. An A/D converter 111 converts the analog RGB TV video signals output from the decoder 60 into digital signals. Here, it is assumed that the A/D converter 111 preferably converts the analog RGB TV video signals into 65,536-color digital RGB data of 18 bits.

A format scaler 113 receives digital RGB data output from the A/D converter 111 and horizontal synchronization signals HSYNC and vertical synchronization signals VSYNC output from the decoder 60, and scales the size of the digital RGB data based on the horizontal synchronization signals HSYNC and the vertical synchronization signals VSYNC. The scaling operation includes a first step of determining a size of a screen to be displayed, a second step of setting a horizontal size VXSIZE and a vertical size VYSIZE according to the size of the screen, a third step of setting a scaling ratio (such as an up-scaling ratio or down-scaling ratio), and a fourth step of setting a calculation result of 720*4096VXSIZE to a horizontal line scaling ratio (HLSR) for the horizontal direction and setting a calculation result of 240*2048/VYSIZE to a vertical line scaling ratio (VLSR) for the vertical direction. In an embodiment of the present invention, it is assumed that an input video signal is scaled to a maximum frame of 220*176 pixels or a minimum frame of 100*75 pixels. The format scaler 113 converts the 18-bit RGB data into 16-bit RGB data. Here, the RGB data of 16 bits [15:0] may comprise Red (R) data of 5 bits [15:11], Green (G) data of 6 bits [10:5], and Blue (B) data of 5 bits [4:0].

A first memory 131 and a second memory 132 store frame size data. In an embodiment of the present invention, the first memory 131 is used to store the user data and minimum frame-sized data (75*100*12 bits). The second memory 132 is used to store maximum frame-sized data (176*220*12 bits) and minimum frame-sized data (75*100*12 bits).

A memory controller 123 controls access to the first memory 131 and the second memory 132 under the control of the controller 10. The memory controller 123 separately controls the first memory 131 and the second memory 132 according to whether the portable terminal is in the TV mode or the communication mode. In the TV mode, the memory controller 123 reads the user data output from the controller 10 from the first memory 131, and stores the minimum frame-sized video data output from the format scaler 113 in the first memory 131 and the maximum frame-sized video data output from the scaler 113 in the second memory 132. The memory controller 123 writes and reads received RGB TV video data in/from the second memory 132 in a maximum frame size. Specifically, while accessing the second memory 132, the memory controller 123 writes received maximum frame-sized video data in the second memory 132 and at the same time, reads previously stored maximum frame-sized video data from the second memory 132, thereby processing the TV video signal in real time.

In the communication mode, the memory controller 123 uses the first memory 131 to access the user data therefrom and the second memory 132 to store background data therein. Here, the memory controller 123 may be configured such that it uses only one of the first memory 131 and the second memory 132, rather than simultaneously using both of them.

An OSD mixer 125 mixes the frame-sized video data and the user data output from the memory controller 123 with OSD data, and outputs the mixed OSD data to the display unit 80.

A control interface 117 interfaces the user data and mode control data between the controller 10 and the video processor 70.

An I$^2$C master 115 has an I$^2$C bus master that can control two slave devices. The I$^2$C master 115 controls the tuner 50 and the decoder 60 and is controlled by the control interface 117.

An OSD controller (or OSD RAM block copy accelerator) 119 can copy an arbitrary square region of the user data in an arbitrary location. The OSD controller 119 can block-copy data of the arbitrary square region in an arbitrary location according to control data output from the control interface 117. Such a copy function can be performed within a memory or between memories.

A timing controller 121 generates the synchronization signals (horizontal synchronization signals HSYNC and vertical synchronization signals VSYNC), detected in the TV mode, and pixel clocks (DOTCLK). The timing controller 121 synchronizes video data pixels, line video data and/or frame video data output from the OSD mixer 125 with one another, and displays the synchronized data on the display unit 80.

Figure 4:
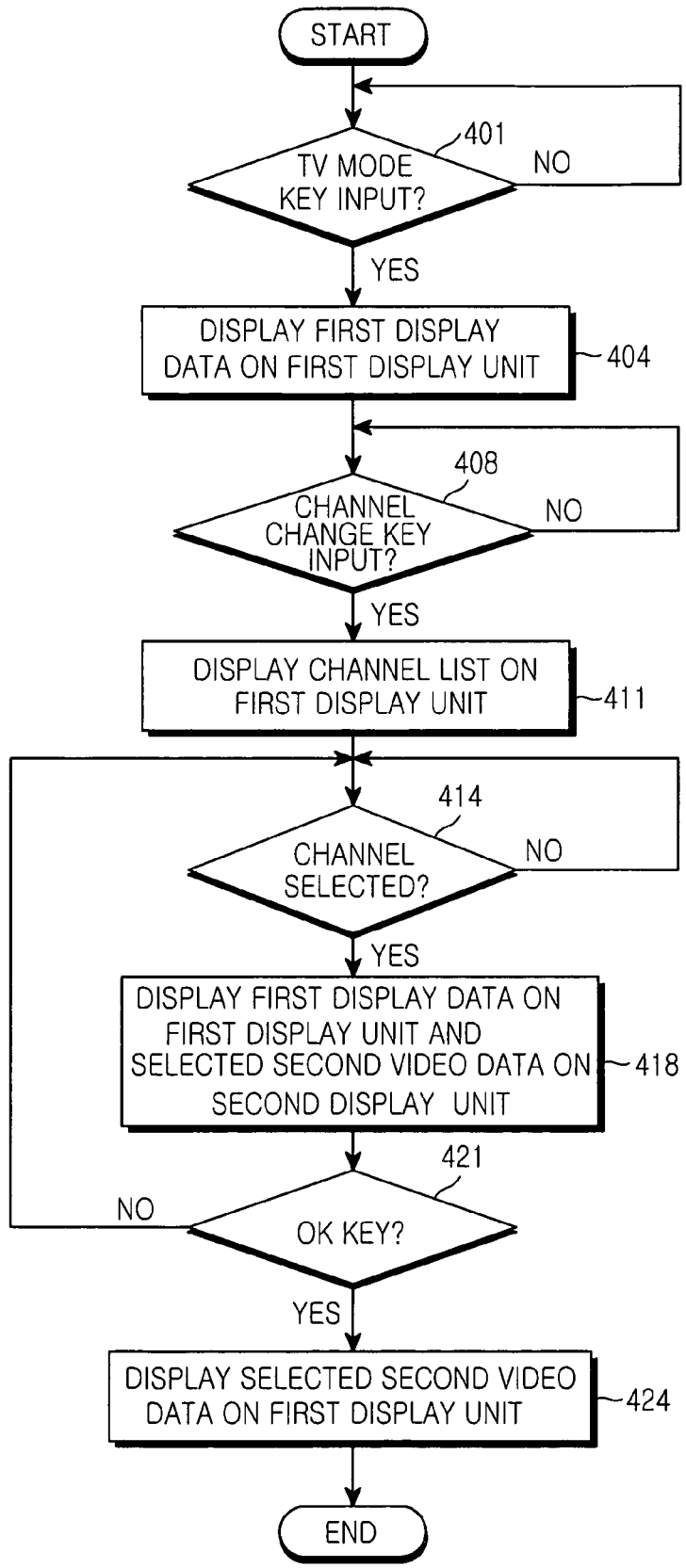
FIG. 4 is a flowchart illustrating a process of changing a channel in a portable terminal according to a first embodiment of the present invention.
Figure 5A:
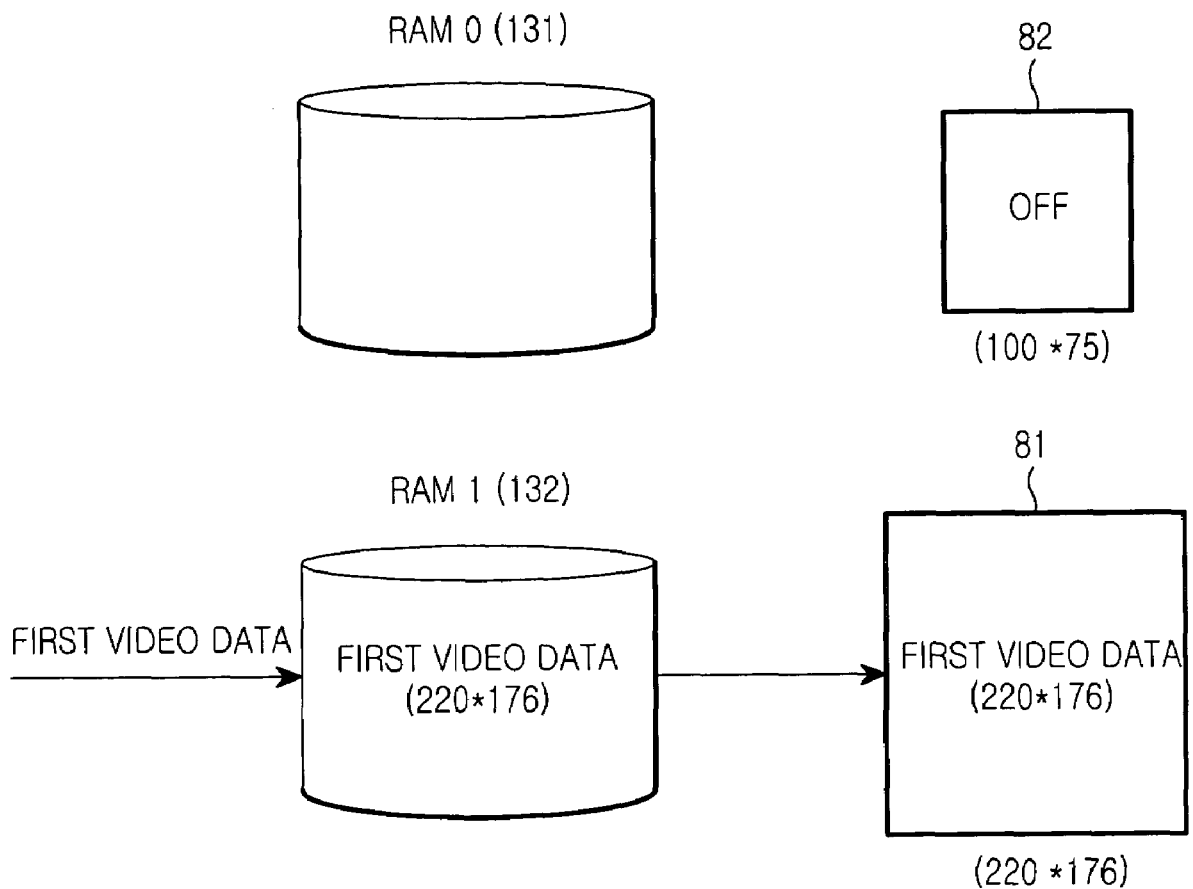
FIGS. 5A through 5C are diagrams illustrating a process of changing a channel according to the first embodiment of the present invention.
Figure 5B:
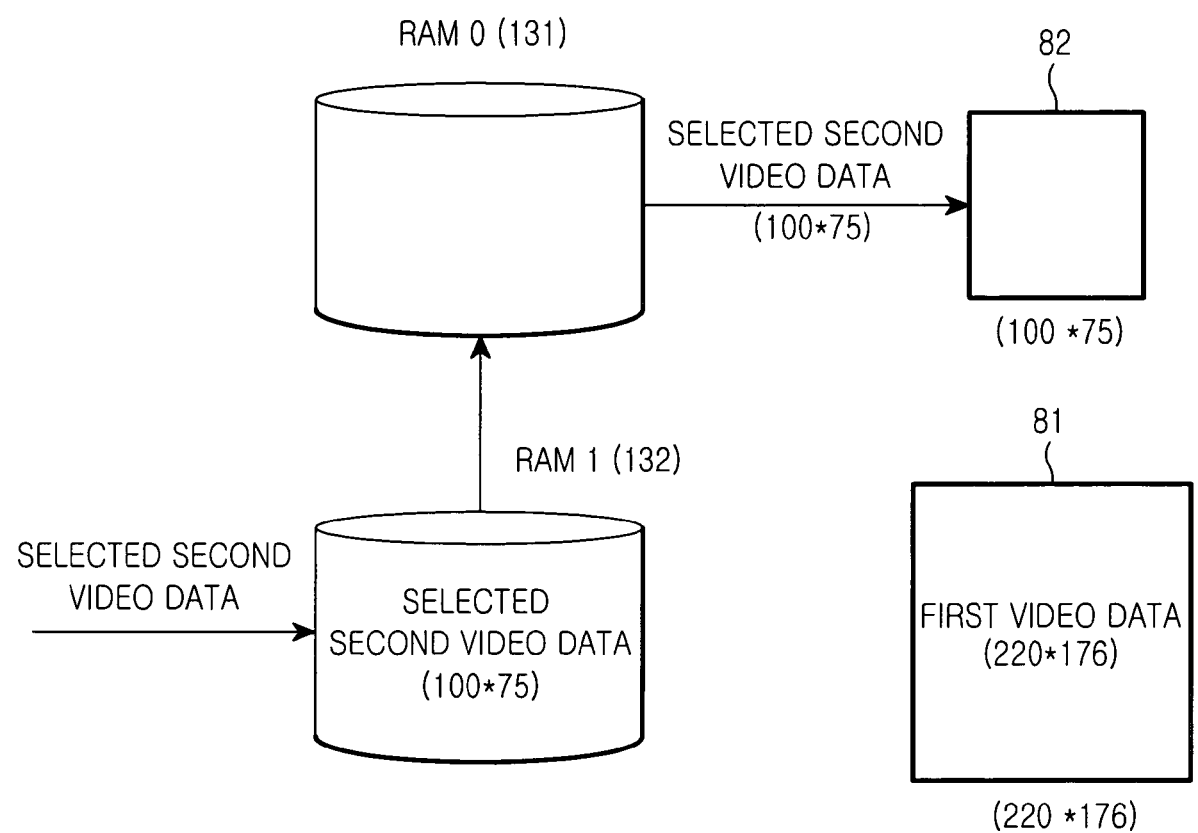
Figure 5C:
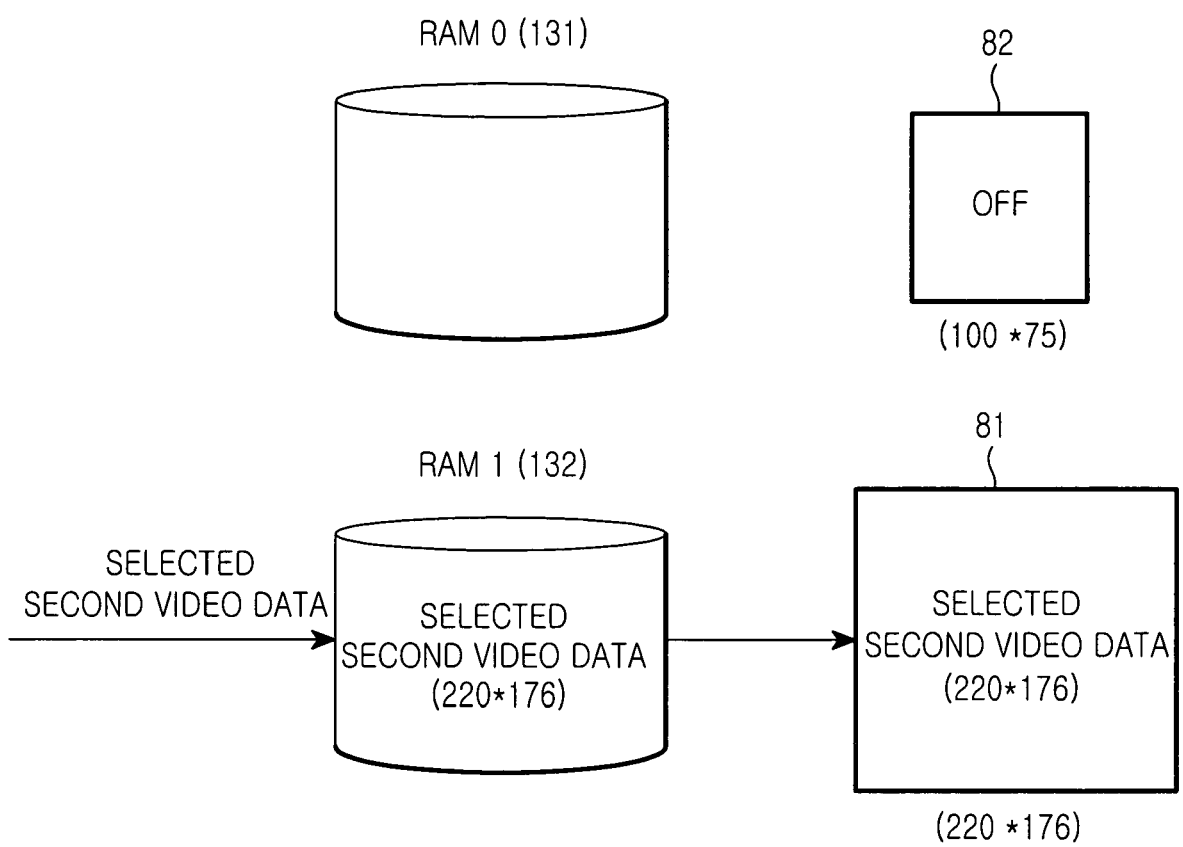

FIG. 4 is a flowchart illustrating a process of changing a channel in a portable terminal according to a first embodiment of the present invention, and FIGS. 5A through 5C are diagrams illustrating a process of changing a channel according to the first embodiment of the present invention.

Now, an embodiment of the present invention will be descried in detail with reference to FIGS. 1 through 5C. In an embodiment of the present invention, TV channels include all types of video channels such as general over-the-air channels and cable TV channels.

Figure 8A:
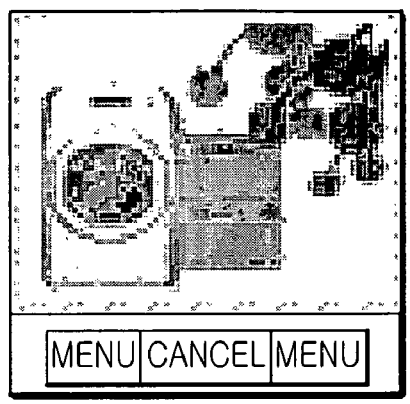
FIGS. 8A through 8F are images illustrating the processes illustrated in FIGS. 4 and 6.

The process of changing a channel in a portable terminal having a video processor with two memories illustrated in FIGS. 5A through 5C will be described. When a TV key is depressed while the portable terminal is in an idle state, the controller 10 detects the pressing of the TV key and sets the TV mode in step 401. In step 404, the controller 10 displays first video data on the first display unit 81 as shown in (A) of FIG. 8A. In other words, the controller 10 outputs channel control data for TV channel selection and the channel control data for TV channel selection is output to the tuner 50 through the control interface 117 and the I$^2$C master 115. At this time, the controller 10 outputs the channel control data to allow access to a channel selected in a previous state. The tuner 50 is then tuned to the selected channel and performs frequency conversion on received first video data, and the decoder 60 outputs analog RGB TV video signals and synchronization signals by decoding the first video signal. The A/D converter 111 then converts the received first analog video signal into first digital video data, and the format scaler 113 scales the first digital video data to a maximum frame size (176*220*12 bits). The memory controller 123 then stores channel number data output from the controller 10 in the first memory 131, stores the first video data scaled to the maximum frame size in the second memory 132, and then displays the first digital video data and the channel number data on the first display unit 81. FIG. 5A shows a process of displaying the first video data on the first display unit 81.

When the user inputs a Channel Change key, the controller 10 detects the user input in step 408, and proceeds to step 411. In step 411, the controller 10 controls the memory 29 and the display unit 80 to overlay a TV channel list on the first display unit 81 and powers on the second display unit 82. When the user selects a channel from the overlaid TV channel list using the keypad 27, the controller 10 detects the channel selection in step 414, and proceeds to step 418. In step 418, the controller 10 controls the memory control unit 123, and the memory controller 123 controls the first memory 131 and the second memory 132 to display the first video data on the first display unit 82 and the second video data on the second display unit 82, as shown in (B) of FIG. 8A.

Specifically, in step 418, the controller 10 controls the memory controller 123 to temporarily stop the screen display operation of the first display unit 81. The controller 10 then outputs TV channel control data to select a TV channel for the second video data, and the TV channel control data is output to the tuner 50 through the control interface 117 and the I²C master 115. The tuner 50 is then tuned to the selected channel for the second video data and performs frequency conversion on the received second video data, and the decoder 60 decodes the selected second video data into RGB analog video signals and synchronization signals. The A/D converter 111 then converts the selected second analog video data into second digital video data, and the format scaler 113 scales the selected second digital video data to the minimum frame size (75*100*12 bits).

After storing channel number data output from the controller 10 in the first memory 131 and the selected second video data scaled to the minimum frame size in the second memory 132, the memory controller 123 block-copies the selected second video data to the first memory 131 and outputs the second video data and the channel number data to the second display unit 82 for display on the second display unit 82.

Figure 8B:
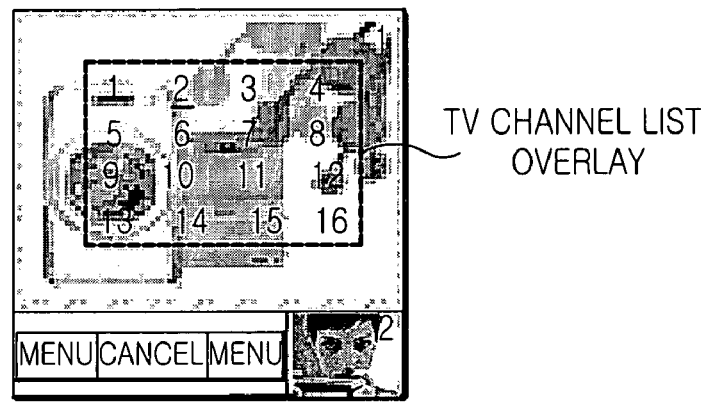
Figure 8C:
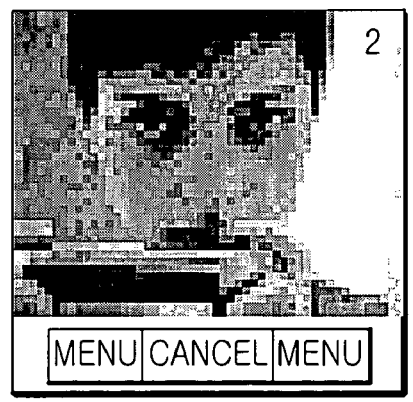
Figure 8D:
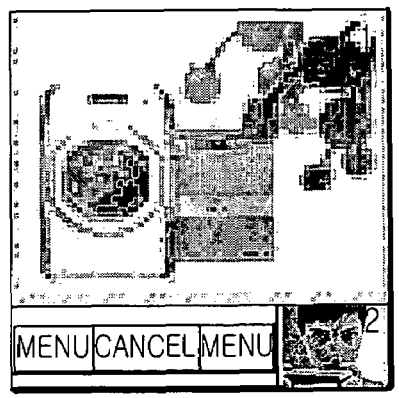
Figure 8E:
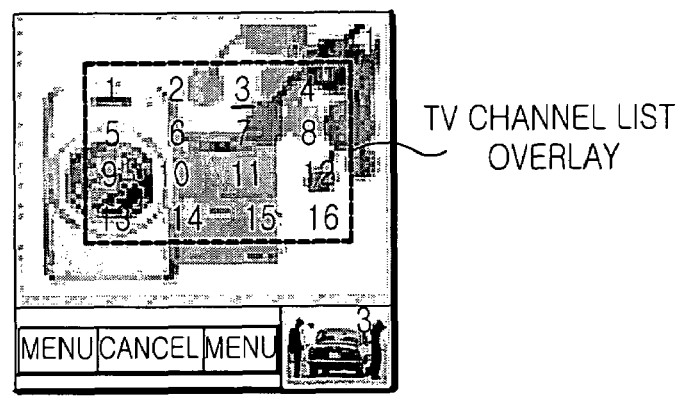

FIG. 5B illustrates a process of displaying the second video data on the second display unit 82 during channel selection, as shown in FIG. 8E. Upon receiving a signal for requesting re-output of the first video data from the controller 10, the memory controller 123 outputs the first video data stored in the second memory 132 to the first display unit 81 for re-display on the first display unit 81. This process can be repeated until the user inputs an OK key.

When the user inputs the OK key, the controller 10 detects the user input in step 421 and proceeds to step 424. In step 424, the controller 10 displays the selected second video data on the first display unit 81 and powers off the second display unit 82, as shown in (C) of FIG. 8A. Specifically, in step 424, the controller 10 controls the memory controller 123 to read the selected second video data scaled to the minimum frame size from the first memory 131. The controller 10 then outputs TV channel control data for channel selection for the selected second video data, and the TV channel control data is output to the tuner 50 through the control interface 117 and the I²C master 115.

Figure 8F:
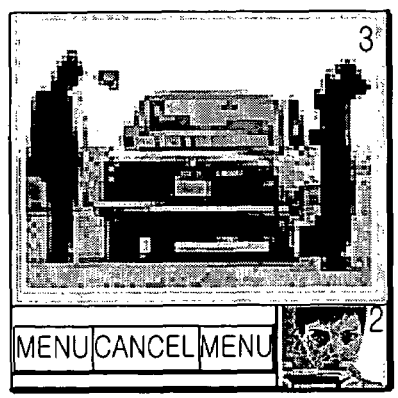

At this time, the controller 10 outputs the TV channel control data to allow access to the selected second video data. The tuner 50 is then tuned to the selected channel and performs frequency conversion on the received second video data, and the decoder 60 decodes the second video data into RGB analog video signals and synchronization signals. The A/D converter 111 then converts the received second analog video data into second digital video data, and the format scaler 113 scales the second digital video data to the maximum frame size (176*220*12 bits), as shown in FIG. 8F. After storing channel number data output from the controller 10 in the first memory 131 and the second digital video data scaled to the maximum frame size in the second memory 132, the memory controller 123 outputs the second digital video data and the channel number data to the first display unit 81 for display on the first display unit 81, as shown in FIG. 8F.

FIG. 5C illustrates a process of displaying the second video data on the first display unit 81. The controller 10 controls the display unit 80 to power off the second display unit 82.

Figure 6:
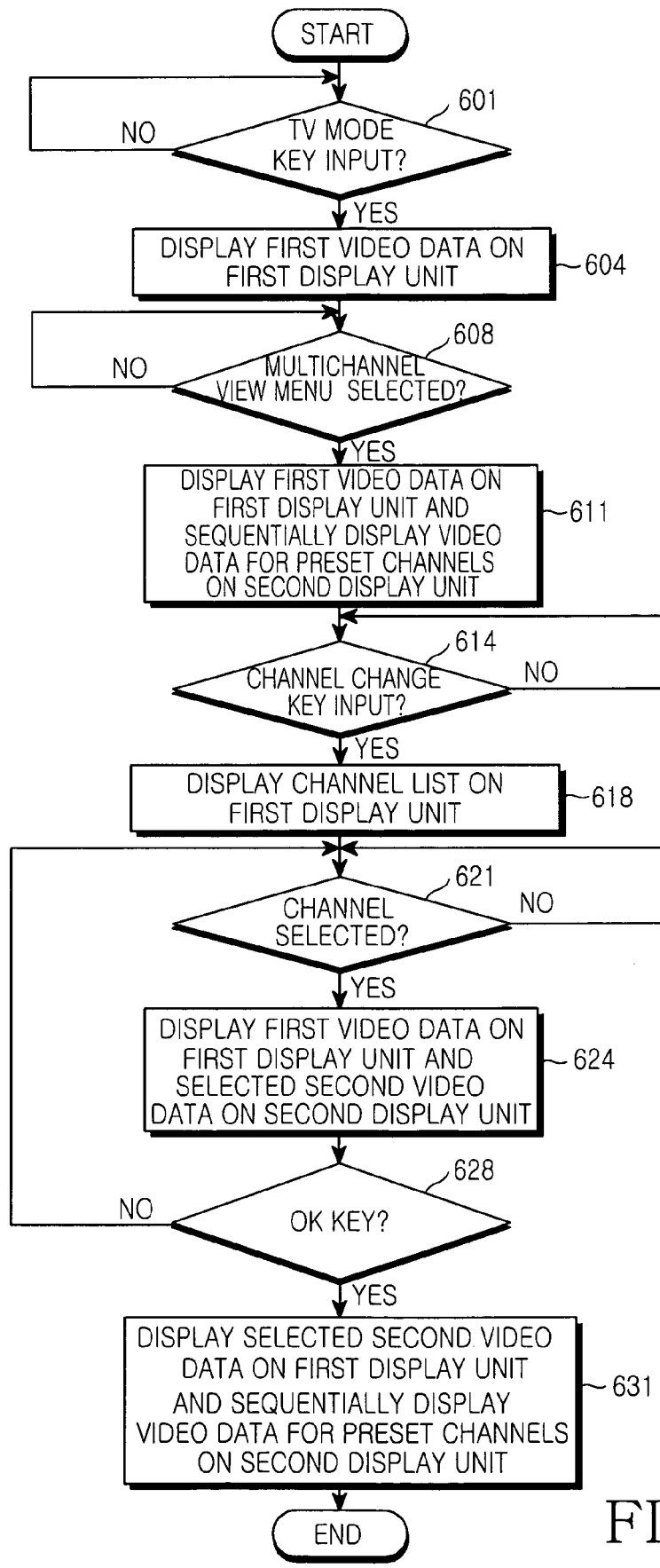
FIG. 6 is a flowchart illustrating a process of changing a channel in a multichannel view mode in a portable terminal according to a second embodiment of the present invention.
Figure 7A:
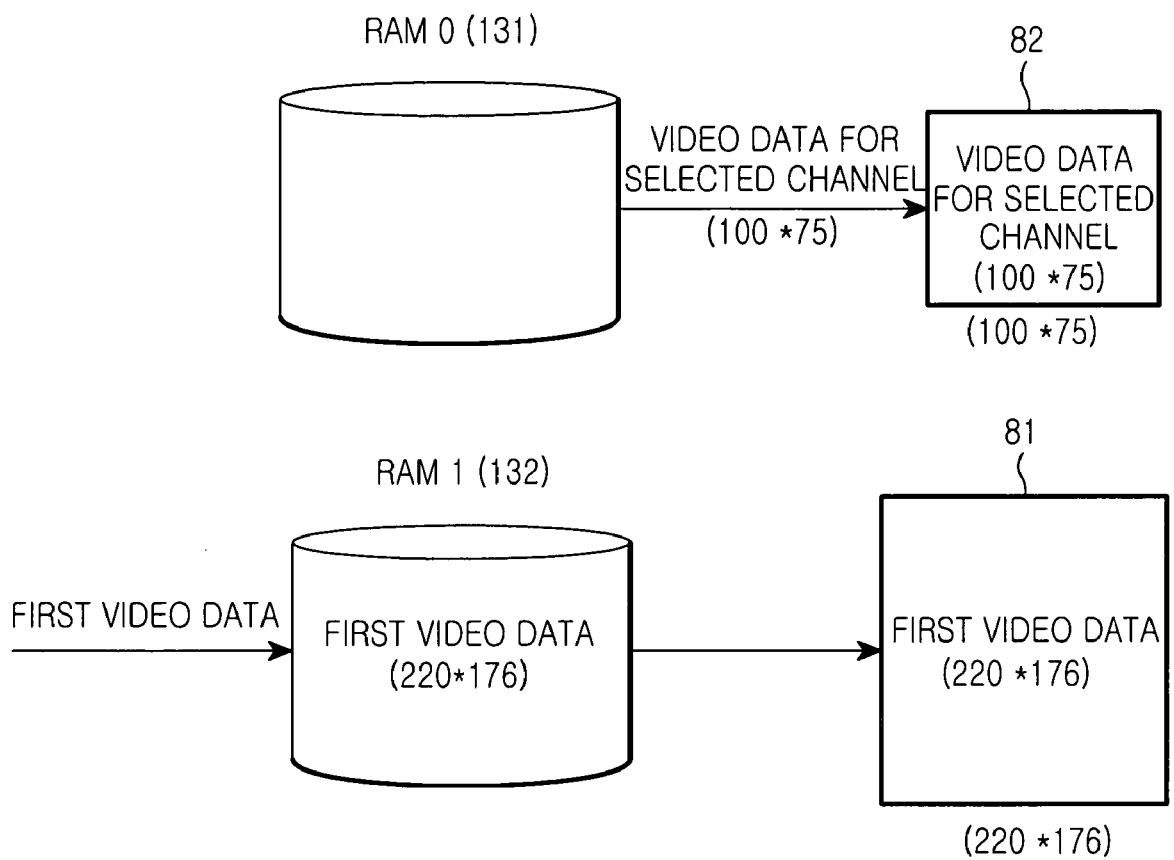
FIGS. 7A through 7C are diagrams illustrating a process of changing a channel in a multichannel view mode according to the second embodiment of the present invention.
Figure 7B:
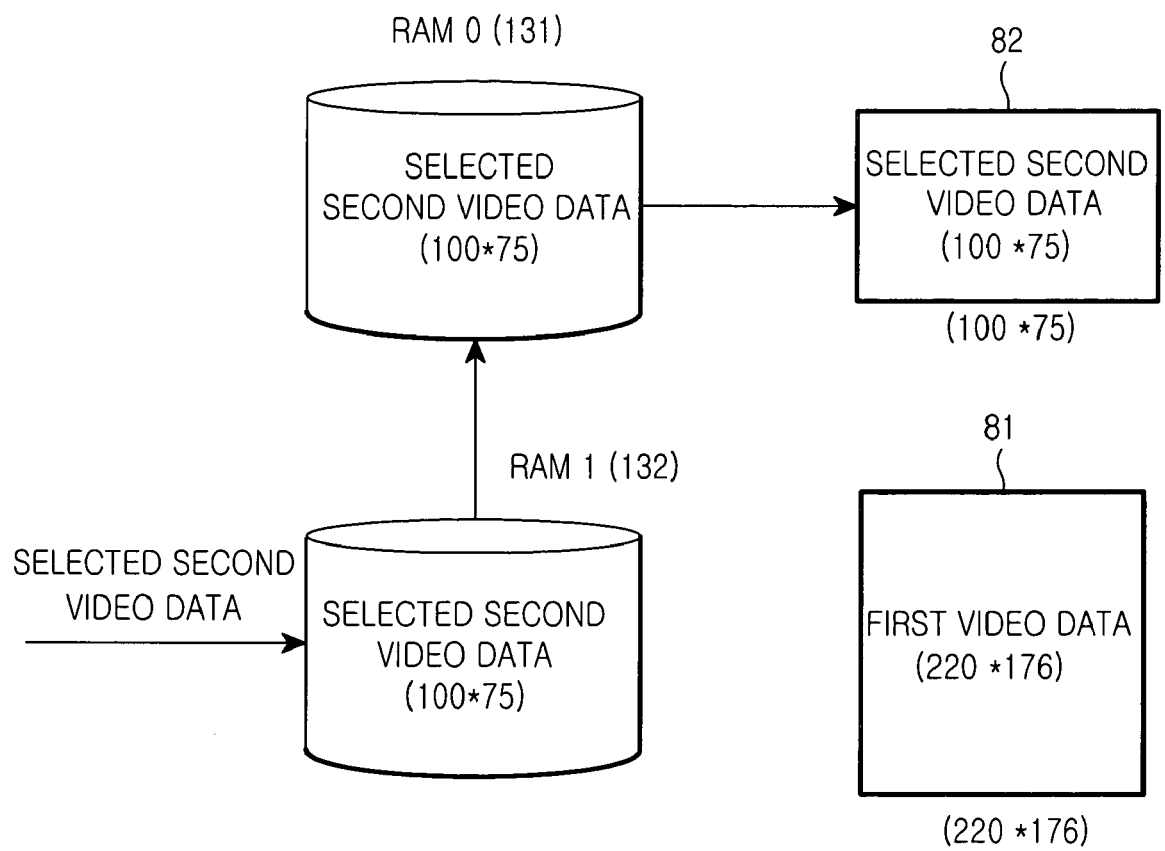
Figure 7C:
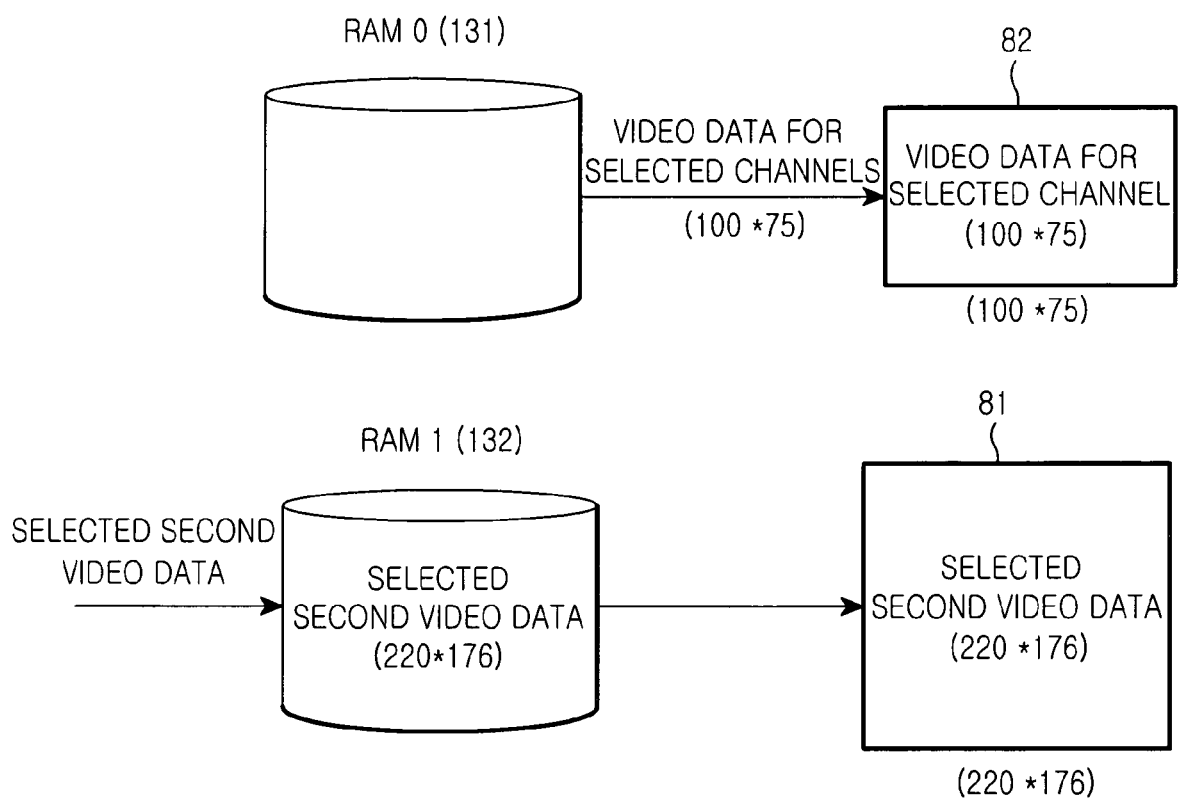

FIG. 6 is a flowchart illustrating a process of changing a channel in a multichannel view mode in a portable terminal according to a second embodiment of the present invention, and FIGS. 7A through 7C are diagrams illustrating a process of changing a channel in a multichannel view mode according to the second embodiment of the present invention. In a multichannel view mode, channels for video data displayed on the second display unit 82 are assumed to have been previously designated. The number of channels for the video data displayed on the second display unit 82 is subject to change.

With reference to FIG. 6, a description will now be made of a process of displaying and changing a channel in a portable terminal including a video processor having two memories shown in FIGS. 7A through 7C. When the TV key is pressed long in the idle state, the controller 10 detects the pressing of the TV key and sets the TV mode in step 601. In step 604, the controller 10 then displays the first video data on the first display unit 81 as shown in (A) of FIG. 8A.

Thereafter, if the user selects a multichannel view menu, the controller 10 detects the menu selection in step 608 and proceeds to step 611. In step 611, the controller 10 controls the memory controller 123, and the memory controller 123 controls the first memory 131 and the second memory 132 to display the first video data on the first display unit 81 and to sequentially display video data for the previously-designated channels on the second display unit 82, as shown in (A) of FIG. 8B. Specifically, in step 611, the controller 10 controls the memory 29 and the display unit 80 to power on the second display unit 82. The controller 10 then controls the memory controller 123 to temporarily stop the screen display operation of the first display unit 81. The controller 10 outputs the TV channel control data to select one of the previously-designated channels displayed on the second display unit 82. The TV channel control data is output to the tuner 50 through the control interface 117 and the I²C master 115. The tuner 50 is then tuned to the selected channel and performs frequency conversion on received video data for the selected channel, and the decoder 60 decodes the received video data for the selected channel into RGB analog video signals and synchronization signals.

The A/D converter 111 then converts the received analog video data for the selected channel into digital video data, and the format scaler 113 scales the digital video data to the minimum frame size (75*100*12 bits). The memory controller 123 then stores channel number data output from the controller 10 in the first memory 131 and video data scaled to the minimum frame size for the selected channel in the second memory 132, block-copies the video data to the first memory 131, and transmits the video data and the channel number data to the second display unit 82 for display on the second display unit 82.

FIG. 7B shows a process of displaying the video data for the previously-designated channels on the second display unit 82. Upon receiving a signal for requesting re-output of the first video data from the controller 10, the memory controller 123 outputs the first video data stored in the second memory 132 to the first display unit 81 for display on the first display unit 81. If the user sets the time (e.g., five minutes), the controller 10 controls the memory 29 to store the set time. After the set time has elapsed, the controller 10 controls the memory controller 123 and the second memory 132 to sequentially display the video data for the previously-designated channels on the second display unit 82.

Thereafter, if the user inputs the Channel Change key, the controller 10 detects the user input in step 614 and proceeds to step 618. In step 618, the controller 10 controls the memory 29 and the display, unit 80 to overlay the TV channel list on the first display unit 81. If the user selects a channel from the overlaid TV channel list using the keypad 27, the controller 10 detects the channel selection in step 621 and proceeds to step 624. In step 624, the controller 10 controls the memory controller 123 and the memory controller 123 controls the first memory 131 and the second memory 132 to display the first video data on the first display unit 81 and the selected second video data on the second display unit 82 as shown in (B) of FIG. 8B. Specifically, in step 624, the controller 10 controls the memory controller 123 to temporarily stop the screen display operation of the first display unit 81. The controller 10 then outputs the TV channel control data for channel selection for the selected second video data, and the TV channel control data is output to the tuner 50 through the control interface 117 and the I²C master 115. The tuner 50 is then tuned to the selected channel for the second video data and performs frequency conversion on the received second video data, and the decoder 60 decodes the received second video data into RGB analog signals and synchronization signals. The A/D converter 111 then converts the received second analog video data to the second digital video data, and the format scaler 113 scales the selected second digital video data to the minimum frame size (75*100*12 bits). The memory controller 123 then stores the channel number data output from the controller 10 in the memory 131, and the memory controller 123 stores the selected second digital video data scaled to the minimum frame size in the second memory 132, block-copies the selected second digital video data to the first memory 131, and transmits the selected second digital video data and the channel number data to the second display unit 82 for display on the second display unit 82.

FIG. 7B illustrates a process of displaying the second video data on the second display unit 82 at the time of channel selection. Upon receiving a signal for requesting re-output of the first video data from the controller 10, the memory controller 123 outputs the first video data stored in the second memory 132 to the first display unit 81 for display on the first display unit 81. This process can be repeated until the user inputs an OK key.

Thereafter, if the user inputs the OK key, the controller 10 detects the user input in step 628 and proceeds to step 631. In step 631, the controller 10 displays the selected second video data on the first display unit 81 as shown in (C) of FIG. 8B and re-outputs the video data for the previously-designated channels for display on the second display unit 82. Specifically, in step 631, the controller 10 controls the memory controller 123 to read the selected second video data scaled to the minimum frame size from the first memory 131. The controller 10 then outputs the TV channel control data for channel selection for the selected second video data, and the TV channel control data is output to the tuner 50 through the control interface 117 and the I²C master 115.

At this time, the controller 10 outputs the TV channel control data to allow access to the selected second video data. The tuner 50 is then tuned to the selected channel and performs frequency conversion on the received second video data, and the decoder 60 decodes the second video data into RGB analog video signals and synchronization signals. The A/D converter 111 then converts the received second analog video data into second digital video data, and the format scaler 113 scales the second digital video data to the maximum frame size (176*220*12 bits). After storing channel number data output from the controller 10 in the first memory 131 and the second digital video data scaled to the maximum frame size in the second memory 132, the memory controller 123 outputs the second digital video data and the channel number data to the first display unit 81 for display on the first display unit 81.

FIG. 7C illustrates the process of displaying the second video data on the first display unit 81 and re-outputting the video data for the previously-designated channels for display on the second display unit 82.

As described above, according to embodiments of the present invention, users can select and change various channels like cable TV channels in a portable terminal having TV functions. Also, since multiple channels are sequentially displayed, users can check and view desired channels at a desired time.

While the invention has been shown and described with reference to certain embodiments thereof, it should be understood by those skilled in the art that various changes in form and details may be made therein without departing from the spirit and scope of the invention as defined by the appended claims.

What is claimed is:

1. A method for displaying television (TV) video data in a portable terminal having a TV video signal receiving function for receiving at least one TV video signal, the method comprising the steps of:
   (a) receiving a first TV video signal broadcast over a first TV channel and a second TV video signal broadcast over a second TV channel;
   (b) frequency converting entirely the first TV video signal;
   (c) frequency converting entirely the second TV video signal;
   (d) displaying a first video image based on the entire frequency converted first TV signal on a first display unit in a TV mode;
   (e) displaying a channel list during a channel change;
   (f) displaying a second video image based on the entire frequency converted second TV signal for a channel selected from the channel list on a second display unit while simultaneously displaying the first video image on the first display unit; and
   (g) displaying the second video image displayed on the second display unit on the first display unit when the second video image displayed on the second display unit is selected.

2. The method of claim 1, further comprising the step of (e) sequentially displaying received video data for at least two channels on the second display unit while displaying the first video image on the first display unit, if a multichannel view mode is selected.

3. The method of claim 1, wherein the channel list is displayed on the first display unit.

4. The method of claim 1, wherein the step (d) comprises the steps of:
   scaling the selected video image displayed on the second display unit to a maximum frame size;
   storing the scaled video image in a second memory; and
   displaying the video image stored in the second memory on the first display unit.

5. The method of claim 2, wherein the step (e) comprises the steps of:
   scaling the received video image to a minimum frame size, storing the scaled video image in a second memory, and block-copying the scaled video image to a first memory;
   outputting the video image block-copied to the first memory and displaying the output video image on the second display unit; and sequentially displaying the video data on the second display unit by repeating the above steps, after a lapse of a predetermined time.

6. The method of claim 3, further comprising:

overlaying the channel list over the image on the first display unit.

7. The method of claim 1, wherein the second display unit is powered on when the channel list is displayed on the first display unit.

8. The method of claim 1, further comprising:

selecting the channel via a tuner.

9. An apparatus for displaying a plurality of video signals on display terminals of a portable terminal, comprising:

a tuner for receiving a first TV video signal broadcast over a first TV channel and a second TV video signal broadcast over a second TV channel and for frequency converting entirely the first TV video signal and for frequency converting entirely the second TV video signal;

a first display unit adapted to display a first video image based on the entire frequency converted first TV video signal;

a second display unit adapted to display a second video image based on the entire frequency converted second TV video signal; and a controller adapted to display a channel list during a channel change on the first display unit, to display the second video image on the second display unit for a channel selected from the channel list while simultaneously displaying the first video image on the first display unit, and to display the second video image displayed on the second display unit on the first display unit if the second video image displayed on the second display unit is selected.

10. The apparatus of claim 9, further comprising:

a first memory adapted to store user data; and a second memory adapted to store at least one video signals.

11. The apparatus of claim 9, wherein the controller is further adapted to sequentially display received video data for at least two channels on the second display unit while displaying the first video image on the first display unit, if a multichannel view mode is selected.

12. The apparatus of claim 9, wherein the channel list is displayed on the first display unit.

13. The apparatus of claim 10, wherein the controller is further adapted to scale the selected video image displayed on the second display unit to a maximum frame size, store the scaled video image in the second memory, and display the video image stored in the second memory on the first display unit.

14. The apparatus of claim 11, wherein the controller is further adapted to scale the received video data to a minimum frame size, store the scaled video data in a second memory, block-copy the scaled video data to a first memory, output the video data block-copied to the first memory and display the output video data on the second display unit, and sequentially display the video data on the second display unit after a lapse of a predetermined time.

15. The apparatus of claim 12, wherein the channel list is overlaid over the image on the first display unit.

16. The apparatus of claim 9, wherein the second display unit is powered on when the channel list is displayed on the first display unit.

17. The apparatus of claim of claim 9, further comprising:

a tuner for selecting the channel and for outputting a frequency converted signal for the selected channel; and a decoder for demodulating and decoding the frequency converted signal from the tuner.

18. The apparatus of claim 17, wherein the decoder comprises a National Television System Committee (NTSC) decoder.

\* \* \* \* \*

UNITED STATES PATENT AND TRADEMARK OFFICE
CERTIFICATE OF CORRECTION

PATENT NO.        : 7,652,722 B2                                  Page 1 of 1
APPLICATION NO.   : 11/103607
DATED             : January 26, 2010
INVENTOR(S)       : Bo-Yeon Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 726 days.

Signed and Sealed this

Twenty-eighth Day of December, 2010

David J. Kappos
*Director of the United States Patent and Trademark Office*